United States Patent
Crews et al.

(10) Patent No.: US 7,527,102 B2
(45) Date of Patent: May 5, 2009

(54) METHODS AND COMPOSITIONS FOR DIVERTING ACID FLUIDS IN WELLBORES

(75) Inventors: James B. Crews, Willis, TX (US); Tianping Huang, Spring, TX (US)

(73) Assignee: Baker Hughes Incorporated, Houston, TX (US)

( * ) Notice: Subject to any disclaimer, the term of this patent is extended or adjusted under 35 U.S.C. 154(b) by 117 days.

(21) Appl. No.: 11/689,203

(22) Filed: Mar. 21, 2007

(65) Prior Publication Data
US 2007/0151726 A1 Jul. 5, 2007

Related U.S. Application Data

(63) Continuation-in-part of application No. 11/373,044, filed on Mar. 10, 2006.

(60) Provisional application No. 60/662,336, filed on Mar. 16, 2005.

(51) Int. Cl.
*E21B 43/27* (2006.01)
*E21B 43/22* (2006.01)

(52) U.S. Cl. .................. 166/307; 166/246; 166/281; 166/282; 166/300

(58) Field of Classification Search .................. None
See application file for complete search history.

(56) References Cited

U.S. PATENT DOCUMENTS 6,667,280 B2  12/2003  Chang et al.
6,903,054 B2   6/2005  Fu et al.

(Continued)

FOREIGN PATENT DOCUMENTS

WO        02070862 A1    9/2002

OTHER PUBLICATIONS

H.A. Nasr-El-Din, et al., "Acid Fracturing of Deep Gas Wells Using a Surfactant-Based Acid: Long-Term Effects on Gas Production Rate," SPE 102469, pp. 1-12, 2006 SPE Annual Technical Conference & Exhibition, Sep. 24-27, 2006.

(Continued)

*Primary Examiner*—Zakiya W. Bates
(74) *Attorney, Agent, or Firm*—Madan Mossman & Sriram PC (57) ABSTRACT

Viscoelastic surfactant (VES) gelled aqueous fluids containing a VES, an internal breaker, and optionally a viscosity enhancer are useful as diverting fluid for directing placement of an acid into a subterranean formation, where the acid is injected subsequent to introducing the VES gelled fluid. These VES-based diverting fluids have faster and more complete clean-up than polymer-based diverting fluids. The viscosity enhancers may include pyroelectric particles and/or piezoelectric particles. The VES gelled fluid may optionally contain a fluid loss agent which increases the viscosity of the fluid and/or facilitates development of an external viscous VES fluid layer (e.g. a pseudo-filter cake) on the formation face. The VES gelled fluid may also optionally contain an agent that stabilizes the viscosity of the fluid, for instance at high temperatures, such as MgO, $Mg(OH)_2$, CaO, $Ca(OH)_2$, NaOH, and the like.

41 Claims, 6 Drawing Sheets

U.S. PATENT DOCUMENTS

| | | |
|---|---|---|
| 7,060,661 B2 | 6/2006 | Dobson, Sr. et al. |
| 7,115,546 B2 | 10/2006 | Qu et al. |
| 7,159,659 B2 | 1/2007 | Welton et al. |
| 2003/0139298 A1* | 7/2003 | Fu et al. ................ 507/200 |
| 2006/0211775 A1 | 9/2006 | Crews |
| 2007/0151726 A1 | 7/2007 | Crews et al. |

OTHER PUBLICATIONS

H.A. Nasr-El-Din, et al., "Lessons Learned and Guidelines for Matrix Acidizing With Viscoelastic Surfactant Diversion in Carbonate Formations," SPE 102468, pp. 1-11, 2006 SPE Annual Technical Conference & Exhibition, Sep. 24-27, 2006.

* cited by examiner

Fig. 1

METHODS AND COMPOSITIONS FOR DIVERTING ACID FLUIDS IN WELLBORES

CROSS-REFERENCE TO RELATED APPLICATION

This application is a continuation-in-part application from U.S. patent application Ser. No. 11/373,044 filed Mar. 10, 2006 which in turn claims the benefit of U.S. provisional application No. 60/662,336 filed Mar. 16, 2005.

TECHNICAL FIELD

The present invention relates to aqueous gelled diverting fluids used to place acids in subterranean formations during hydrocarbon recovery operations, and more particularly relates, in one embodiment, to aqueous diverting fluids containing viscoelastic surfactant gelling agents and viscosity enhancers also having internal components to "break" or reduce the viscosity of the gelled fluid after treatment, and methods of using these fluids.

TECHNICAL BACKGROUND

Hydrocarbons sometimes exist in a formation but cannot flow readily into the well because the formation has very low permeability. In order for hydrocarbons to travel from the formation to the wellbore there must be a flow path from the formation to the wellbore. This flow path is through the formation rock and has pores of sufficient size and number to allow a conduit for the hydrocarbons to move through the formation. In some subterranean formations containing hydrocarbons, the flow paths are of low incidence or occurrence and/or size that efficient hydrocarbon recovery is hampered.

With respect to wells that previously produced satisfactorily, a common reason for a decline in oil and gas production from a particular formation is damage to the formation that plugs the rock pores and impedes the flow of oil to the wellbore and ultimately to the surface.

Well stimulation refers to the various techniques employed to improve the permeability of a hydrocarbon-bearing formation. Three general well-stimulation techniques are typically employed. The first involves injecting chemicals into the wellbore to react with and dissolve permeability damaging materials such as wellbore coatings, e.g. as may remain from previously used drilling fluids. A second method requires injecting chemicals through the wellbore and into the formation to react with and dissolve small portions of the formation thereby creating alternative flow paths for the hydrocarbons to flow to the wellbore. These alternative flow paths redirect the flow of hydrocarbons around the low permeability or damaged areas of the formation. A third technique, often referred to as fracturing, involves injecting chemicals into the formation at pressures sufficient to actually fracture the formation, thereby creating a relatively large flow channel though which hydrocarbon can more readily move from the formation and into the wellbore.

Acidizing treatments of wells are a conventional process for increasing or restoring the permeability of subterranean formations so as to facilitate the flow of oil and gas from the formation into the well. The acid treatment is to remove formation damage along as much of the hydrocarbon flow path as possible, and/or to create new flow paths. An effective treatment should remove as much damage as possible along the entire flow path. This process involves treating the formation with an acid to dissolve fines and carbonate scale plugging or clogging the pores, thereby opening the pores and other flow channels and increasing the permeability of the formation. Continued pumping forces the acid into the formation, where it etches channels or wormholes. These channels provide ways for the formation hydrocarbons to enter the well bore.

Conventional acidizing fluids, such as hydrochloric acid or a mixture of hydrofluoric and hydrochloric acids, have high acid strength and quick reaction with fines and scale nearest the well bore. These particular acids have a tendency to corrode tubing, casing and down hole equipment, such as gravel pack screens and down hole pumps, especially at elevated temperatures, in particular, above 200° F. (92° C.). In many cases organic acids are used in place of hydrochloric acid, such as formic and acetic acids.

Thickened acid fluids also have applications in hydraulic fracturing and in other well stimulation techniques known to one of ordinary skill in the art. Hydraulic fracturing is a method of using pump rate and hydraulic pressure to fracture or crack a subterranean formation. Once the crack or cracks are made, high permeability proppant, relative to the formation permeability, is pumped into the fracture to prop open the crack. When the applied pump rates and pressures are reduced or removed from the formation, the crack or fracture cannot close or heal completely because the high permeability proppant keeps the crack open. The propped crack or fracture provides a high permeability path connecting the producing wellbore to a larger formation area to enhance the production of hydrocarbons. When an acid is used in the fracturing fluid to increase or restore permeability to the formation, the treatment is term "acid fracturing" or "acid frac".

A successful acid treatment includes uniform placement of fresh acid fluids on the desired area. Chemical diverting agents attempt to temporarily block the high permeability interval or area and divert the fresh acid fluids into the desired low permeability or damaged intervals or areas. Conventional chemical diverters may be benzoic acid flakes, resins, and the like. More than two sequential stages composed of acid fluids followed by foamed or viscous acid diverter fluids have also been used to more uniformly distribute the fresh acid fluids in the hydrocarbon producing formation. Foamed diverter fluids are typically brines, such as 3% bw ammonium chloride brine, containing up to 2% bv high-foaming surfactant and possibly other additives. Viscous diverter fluids are typically brines that contain polymer to thicken the brine, such as hydroxyethylcellulose (HEC). The use of diverting agents and diverter fluids has shown favorable results, however in many cases their efficiency in diverting acid can be poor and there can be problems cleaning-up the diverter from the treated reservoir. There is still a need for new methods for diverting acid fluids that are robust in performance and less problematic during cleanup, particularly to find a diverting system that helps direct the placement of acid effectively through the surrounding formation, and which may be easily, quickly and completely removed after the acid treatment.

Recently it has been discovered that aqueous drilling and treating fluids may be gelled or have their viscosity increased by the use of non-polymeric viscoelastic surfactants (VES). These VES materials are in many cases advantageous over the use of polymer gelling agents in that they are comprised of low molecular weight surfactants rather than high molecular polymers whereby polymer accumulations (e.g. polymeric filtercake) can be avoided. Viscoelastic type surfactants generate viscosity in aqueous fluids by forming unique elongated micelle arrangements. These unique arrangements have often been referred to as worm-like or rod-like micelles structures.

Additionally, VES gelled aqueous fluids may exhibit very high viscosity at very low shear rates and under static conditions.

Little progress has been made toward developing internal breaker systems for the non-polymeric VES-based gelled fluids. Conventionally, VES gelled fluids have relied only on "external" or "reservoir" conditions for viscosity reduction (breaking) and VES fluid removal (clean-up) during hydrocarbon production. Additionally, over the past decade it has been found that reservoir brine dilution has only a minor, if any, breaking effect of VES gel within the reservoir.

Instead, only one reservoir condition is primarily relied on for VES fluid viscosity reduction (gel breaking or thinning), and that has been the rear-ranging, disturbing, and/or disbanding of the VES worm-like micelle structure by contacting the hydrocarbons within the reservoir, more specifically contacting and mixing with crude oil and condensate hydrocarbons, as described in the aforementioned U.S. Pat. No. 5,964,295. In one non-limiting embodiment, it is believed that the gel or increased viscosity is imparted to the aqueous fluid by the worm-like or rod-like micelles become entangled with one another.

However, in many gas wells and in cases of excessive displacement of crude oil hydrocarbons from the reservoir pores during a VES gel treatment, results have shown many instances where VES fluid in portions of the reservoir are not broken or are incompletely broken resulting in residual formation damage (hydrocarbon production impairment). Contacting and breaking the viscous micelle-based fluid by reservoir hydrocarbons in all parts of the reservoir is not always effective. One viable reason is the exceptionally high viscosity that VES fluid can exhibit at very low shear rates and static conditions which makes the fluid difficult to move and remove from porous media (i.e. the pores of the reservoir). Hydrocarbon producing reservoirs typically have heterogeneous permeability, where VES fluid within the less permeable portions of the reservoir may be even more difficult to move and cleanup. The very high viscosity at very low shear rates can prevent uniform contacting and breaking of viscous VES fluid by the reservoir hydrocarbons. Channeling and by-passing of viscous VES fluid often occurs that results in impaired hydrocarbon production. In such cases post-treatment clean-up fluids composed of either aromatic hydrocarbons, alcohols, surfactants, mutual solvents, and/or other VES breaking additives have been pumped within the VES treated reservoir in order to try and break the VES fluid for removal. However, placement of clean-up fluids is problematic and normally only some sections of the reservoir interval are cleaned up, leaving the remaining sections with unbroken or poorly broken VES gelled fluid that impairs hydrocarbon production.

Because of this phenomenon and other occasions where reliance on external factors or mechanisms has failed to clean-up the VES fluid from the reservoir during hydrocarbon production, or in cases where the external conditions are slow acting (instances where VES breaking and clean-up takes a long time, such as several days up to possibly months) to break and then produce the VES treatment fluid from the reservoir, and where post-treatment clean-up fluids (i.e. use of external VES breaking solutions) are inadequate in removing unbroken or poorly broken VES fluid from all sections of the hydrocarbon bearing portion of the reservoir, there has been an increasing and important industry need for VES fluids to have internal breakers. Desirable internal breakers that should be developed include breaker systems that use products that are incorporated within the VES-gelled fluid that are activated by downhole temperature or another mechanism that will allow a controlled rate of gel viscosity reduction over a rather short period of time of 1 to 16 hours or so, similar to gel break times common for conventional polymeric fluid systems.

A challenge has been that VES-gelled fluids are not comprised of polysaccharide polymers that are easily degraded by use of enzymes or oxidizers, but are comprised of surfactants that associate and form viscous rod- or worm-shaped micelle structures that exhibit very high apparent viscosity at very low fluid shear rates. Conventional enzymes and oxidizers have not been found to act and degrade the surfactant molecules or the viscous micelle structures they form. It is still desirable, however, to provide some mechanism that relies on and uses internal phase breaker products that will help assure complete viscosity break of VES-gelled fluids.

It would be desirable if a viscosity breaking system could be devised to break the viscosity of fluids gelled with and composed of viscoelastic surfactants so that they may be effectively used for acid diverting, and particularly break the viscosity completely and relatively quickly. It would also be advantageous if a composition and method could be devised to overcome some of the problems in the conventional acidizing methods and fluids.

SUMMARY

There is provided, in one form, a method for directing placement of acid in a subterranean formation that involves introducing a viscoelastic surfactant gelled fluid into a subterranean formation. The viscoelastic surfactant gelled fluid may contain water, a viscoelastic surfactant (VES) in an amount that increases the viscosity of the water, an internal breaker, and optionally a viscosity enhancer. Suitable internal breakers include, but are not limited to, mineral oils, hydrogenated polyalphaolefins, saturated fatty acids, unsaturated fatty acids, and mixtures thereof. Suitable viscosity enhancers include, but are not limited to, pyroelectric particles, piezoelectric particles, and mixtures thereof. The pyroelectric particles and piezoelectric particles are not necessarily limited in size, although in most embodiments it is expected they will have an average particle size of 500 nm or less as well. Sequential stages of the acid fluid followed by the viscoelastic surfactant gelled diverter fluid are introduced into the subterranean formation. The acid fluid is more uniformly placed within the formation as at least partially directed by the viscoelastic surfactant gelled fluid.

After the acid treatment is complete, the viscosity of the viscoelastic surfactant gelled fluid is reduced with the internal breaker. The broken VES fluid may then be easily and readily recovered from the well prior to production and recovery of hydrocarbons. The reliance on or need for reservoir hydrocarbons to clean-up the viscous acid diverter fluid is not required. The internal breakers upon activation over time degrade the viscous acid diverter fluid within the reservoir into an easily producible fluid. Additionally, when viscosity enhancer particles are used, due to their size, they are also readily producible with the broken diverter fluid.

Optionally, a fluid loss agent may be introduced with the viscoelastic surfactant gelled fluid, or subsequent thereto. If the fluid loss control agent is introduced into the subterranean formation after the viscoelastic surfactant gelled fluid is introduced, it will build or help build a pseudo-filter cake on the formation.

Additionally, a high temperature viscosity stabilizer may be introduced with the VES fluid. If the high temperature stabilizer is introduced with the VES fluid, in most cases it

DETAILED DESCRIPTION

VES gelled aqueous fluids may exhibit very high viscosity at very low shear rates and under static conditions. The exceptionally high viscosity at low shear rates, often in thousands of centipoise, can make the VES gelled fluid very difficult to move and displace from the pores and fractures of the formation which can be ideal for diverting acid fluids. However, while the very high viscosity at very low shear rate may be good for diverting acid fluids, this in turn may make VES-based diverter fluids hard to clean up. Thus, it is important that the viscosity of any VES-based diverter fluid be reduced or broken in some manner so that it may be easily and quickly flowed back from the formation.

A viscoelastic surfactant-internal breaker aqueous fluid system optionally containing viscosity enhancers and methods for using the system for acid diverting in subterranean formations penetrated by a well bore have been discovered. These diverting fluids may help place acid more uniformly in the formation where acid treatment is needed. In one non-limiting embodiment, the permeability of the subterranean formation is improved by a process including, but not necessarily limited to, etching channels, dissolving scale, removing fines, and combinations thereof.

A viscous gel starts to develop when the viscoelastic surfactant (VES) is mixed with an aqueous base fluid. A salt or other counterion may be used in the aqueous fluid containing VES to help promote viscous micelle formation. The VES-based diverter fluid is pumped in one or more sequential stages with the acid fluid to redirect placement of the acid fluid during the acidizing treatment. The stages of viscoelastic surfactant gelled fluid (that contains the mineral oil and/or fish oil, transition metal ion source, saponified fatty acid, unsaturated or saturated fatty acid or other internal breaker, e.g.) maintains a much higher viscosity in comparison to the acid fluid to effectively divert fresh acid to new locations to more evenly place acid on rock surfaces during the continuation of the pumping process. The viscosity of the VES gelled fluid is particularly improved, increased or enhanced, particularly at low shear rates, by the presence of particulate viscosity enhancers. The viscosity enhancers further improve the ability of the VES-based aqueous fluid to divert acid systems. After completion of the pumping treatment and shut-in of the well, the internal breaker (e.g. mineral oil and/or fish oil) breaks the viscous gel, i.e. lowers the viscosity of the diverter fluid. The internally broken VES fluid is very easy to flow back with the producing fluid, leaving little or no damage to the formation. Very little reservoir pressure or time is required to produce and clean up the broken VES fluid. No reliance on reservoir hydrocarbons is required to contact and clean up the VES diverter fluid. Because of their nanometer size and the minute amount used, the particulate viscosity enhancers and/or stabilizers are also readily producible and will readily clean-up and flowback with the broken VES fluid, leaving little to no particulate damage to the formation.

As noted, aqueous fluids gelled with viscoelastic surfactants are typically used in wellbore completions, such as hydraulic fracturing, without the use of an internal breaker system, and typically rely on external downhole conditions for the VES-gelled fluid to break, such as dilution with reservoir brine and more importantly gel breaking through interaction with reservoir hydrocarbons during production of such reservoir fluids to the surface. However, reliance on external downhole conditions has showed instances where unbroken or poorly broken VES fluid remains within the reservoir after a VES fluid treatment and has impaired hydrocarbon production. There are aqueous fluids gelled with viscoelastic surfactants that are known to be "broken" or have their viscosities reduced, although some of the known breaking methods utilize external clean-up fluids as part of the treatment design (such as pre- and post-flush fluids placed within the reservoir before and after well completion treatments, such as conventional gravel packing and also "frac-packing"—hydraulic fracturing followed by gravel packing treatment). There are other known methods, but they are relatively slow—for instance the use of VES-gel breaking bacteria with fluid viscosity break times ranging from half a day up to 7 days. There has evolved in the stimulation fluid art an industry standard need for "quick gel break", but for VES-gelled fluids this has been a substantially challenging problem. There needs to be a method for breaking VES-gelled fluids that can be as easy, as quick, and as economic as breaking conventional polymeric fluids, preferably using an internal breaker. At the same time, it is not desirable to reduce the viscosity of the fluid, i.e. break the gel immediately or essentially instantaneously. Of considerable concern is the fact than an unbroken VES fluid has exceptionally high viscosity at very low shear rate and static conditions which makes it difficult for reservoir hydrocarbons to contact all of the VES fluid and to displace it from the pores of a treated reservoir. This is particularly true for gas reservoirs and crude oil reservoirs that have heterogeneous permeability with high relative permeability sections present.

New methods have been discovered to reduce the viscosity of aqueous fluids gelled with viscoelastic surfactants (i.e. surfactants that develop viscosity in aqueous brines, including chloride brines, by formation of rod- or worm-shaped micelle structures). The new methods remove the need or reliance on reservoir hydrocarbons to contact, break, and cleanup the viscoelastic fluid. The improvements will allow relatively very quick breaks, such as within 1 to about 16 hours, compared to using bacteria to break VES which takes at least 48 or more hours, and more typically 4 to 7 days. In another non-limiting embodiment the break occurs within about 1 to about 8 hours; alternatively from about 1 to about 4 hours, and in another non-restrictive version about 1 to about 2 hours. The breaker components herein can be used as an internal breaker, e.g. added to the gel after batch mixing of a VES-gel treatment, or added on-the-fly after continuous mixing of a VES-gel treatment using a liquid additive metering system in one non-limiting embodiment, or the components can be used separately, if needed, as an external breaker solution to remove VES gelled fluids already placed downhole. Internal breakers suitable for the methods and compositions herein include transition metal ion sources, reducing agent sources, chelating agent sources, alkali metal sources, alkaline earth metal sources, saponified fatty acids, mineral oils, hydrogenated polyalphaolefin oils, saturated fatty acids, unsaturated fatty acids and combinations thereof. Bacteria may also be used alone or conjunction with these other internal breakers, although as noted, reducing the viscosity of VES gelled fluids with bacteria is relatively slow. The use of bacteria as a viscosity breaker for VES gelled fluids is described in U.S. Pat. No. 7,052,901 to Baker Hughes, incorporated herein in its entirety by reference.

The internal breakers (e.g. mineral oils, hydrogenated polyalphaolefin oils, saturated fatty acids, polyunsaturated fatty acids, and the like) are not solubilized in the brine, since they are inherently hydrophobic, but rather interact with the VES surfactant worm-like micelle structures initially as dispersed microscopic oil droplets and thus form an oil-in-water type emulsion where the oil droplets are dispersed in the "internal phase" as a "discontinuous phase" of the brine medium/VES fluid which is the "outer phase" or "continuous phase". Laboratory tests have shown that small amounts of unsaturated fatty acids, enough to eventually completely the break VES viscosity, will not spontaneously degrade VES viscosity upon individual association and dispersion within the VES micelles, but will become active to degrade VES viscosity upon activation, such as auto-oxidation of the fatty acids to products that disrupt the elongated, "rod-like" or "worm-like" micelles.

Surprisingly and unexpectedly the method may employ one or more mineral oil (as a non-limiting example of a suitable breaker) as the breaking component. This is surprising because, as previously discussed, the literature teaches that contact of a VES-gelled fluid with hydrocarbons, such as those of the formation in a non-limiting example, essentially instantaneously reduces the viscosity of the gel or "breaks" the fluid. By "essentially instantaneously" is meant less than one-half hour. The rate of viscosity break for a given reservoir temperature by the methods described herein is controlled by type and amount of salts within the mix water (i.e. seawater, KCl, NaBr, $CaCl_2$, $CaBr_2$, $NH_4Cl$ and the like), presence of a VES gel stabilizer (i.e. MgO, ZnO and the like), presence of a co-surfactant (i.e. sodium dodecyl sulfate, sodium dodecyl benzene sulfonate, potassium laurate, potassium oleate, sodium lauryl phosphate, and the like), VES type (i.e. amine oxide, quaternary ammonium salt, and the like), VES loading, the amount of breaker (e.g. mineral oil) used, the distillation range of the mineral oil, its kinematic viscosity, the presence of components such as aromatic hydrocarbons, and the like.

In most cases it is important to add the mineral oil after the VES is added to the aqueous fluid. That is, order of addition for the mineral oil used is important. However, there may be specific mineral oils with unique properties that will allow the mineral oil to be added before the VES product and not interfere with or only slightly influence the initial viscosity generated at the surface by the VES product in brine, but will eventually be effective to break the VES fluid viscosity when heated downhole, and the like. The amount of VES added may be one factor that may allow this order of addition. Mineral oil (also known as liquid petrolatum) is a by-product in the distillation of petroleum to produce gasoline. It is a chemically inert transparent colorless oil composed mainly of linear, branched, and cyclic alkanes (paraffins) of various molecular weights, related to white petrolatum. Mineral oil is produced in very large quantities, and is thus relatively inexpensive. Mineral oil products are typically highly refined, through distillation, hydrogenation, hydrotreating, and other refining processes, to have improved properties, and the type and amount of refining varies from product to product. Highly refined mineral oil is commonly used as a lubricant and a laxative, and with added fragrance is marketed as "baby oil" in the U.S. Most mineral oil products are very inert and non-toxic, and are commonly used as baby oils and within face, body and hand lotions in the cosmetics industry. Other names for mineral oil include, but are not necessarily limited to, paraffin oil, paraffinic oil, lubricating oil, white mineral oil, and white oil.

In one non-limiting embodiment the mineral oil is at least 99 wt % paraffinic. Because of the relatively low content of aromatic compounds, mineral oil has a better environmental profile than other oils. In general, the more refined and less aromatic the mineral oil, the better. In another non-restrictive version, the mineral oil may have a distillation temperature range from about 160 to about 550° C., alternatively have a lower limit of about 200° C. and independently an upper limit of about 480° C.; and a kinematic viscosity at 40° C. from about 1 to about 250 cSt, alternatively a lower limit of about 1.2 independently to an upper limit of about 125 cSt. Specific examples of suitable mineral oils include, but are not necessarily limited to, Benol®, Carnation®, Kaydol®, Semtol®, Hydrobrite® and the like mineral oils available from Crompton Corporation, Escaid®, Exxsol® Isopar® and the like mineral oils available from ExxonMobil Chemical, and similar products from other mineral oil manufacturers. The Escaid 110® and Conoco LVT-200® mineral oils have been well known components of oil-based drilling muds and the oil industry has considerable experience with these products, thus making them an attractive choice. The white mineral oils from Crompton Corporation with their high purity and high volume use within other industries are also an attractive choice.

It has been discovered in breaking VES-gelled fluids prepared in monovalent brines (such as 3% KCl brine) that at temperatures below about 180° F. (82° C.) Escaid® 110 works well in breaking VES-gelled fluids, and that at or above about 140° F. (60° C.) Hydrobrite® 200 works well. The use of mineral oils herein is safe, simple and economical. In some cases for reservoir temperatures between about 120° to about 240° F. (about 49° to about 116° C.) a select ratio of two or more mineral oil products, such as 50 wt % Escaid® 110 to 50 wt % Hydrobrite® 200 may be used to achieve controlled, fast and complete break of a VES-gelled fluid.

It has also been discovered that type and amount of salt within the mix water used to prepare the VES fluid (such as 3 wt % KCl, 21 wt % $CaCl_2$, use of natural seawater, and so on) and/or the presence of a VES gel stabilizer (such as VES-STA 1 available from Baker Oil Tools) may affect the activity of a mineral oil in breaking a VES fluid at a given temperature. For example, Escaid® 110 at 5.0 gptg will readily break the 3 wt % KCL based VES fluid at 100° F. (38° C.) over a 5 hour period. Escaid® 110 also has utility as a breaker for a 10.0 ppg $CaCl_2$ (21 wt % $CaCl_2$) based VES fluid at 250° F. (121° C.) when a VES stabilizer (2.0 pptg VES-STA 1) is included. More information about using mineral oils, hydrogenated polyalphaolefin oils and saturated fatty acids as internal breakers may be found in U.S. patent application Ser. No. 11/517,688 filed Sep. 8, 2006, incorporated by reference herein in its entirety.

In one non-limiting embodiment these gel-breaking products or breakers work by rearrangement of the VES micelles from rod-shaped or worm-shaped elongated structures to spherical structures. The breaking components described herein may also include the unsaturated fatty acid or polyenoic and monoenoic components of U.S. Patent Application Publication 2006/0211776, Ser. No. 11/373,044 filed Mar. 10, 2006, incorporated herein in its entirety by reference. In one non-limiting embodiment these unsaturated fatty acids (e.g. oleic, linoleic, linolenic, eicosapentaenoic, etc.) may possibly be used alone—in oils they are commonly found in (flax oil, soybean oil, etc), and can be provided as custom fatty acid blends (such as Fish Oil 18:12TG by Bioriginal Food & Science Corp.)—or used together with the mineral oils herein. In another non-limiting embodiment, natural saturated hydrocarbons such as terpenes (e.g. pinene, d-limonene, etc.), saturated fatty acids (e.g. lauric acid, palmitic acid, stearic acid, etc. from plant, fish and/or animal origins) and the like may possibly be used together with or alternatively to the mineral oils herein. In some cases it is preferred that the plant or fish oil be high in polyunsaturated fatty acids, such as flax oil, salmon oil, and the like. The plant and fish oils may be refined, blended and the like to have the desired polyunsaturated fatty acid composition modified for the compositions and methods herein. Other refinery distillates may potentially be used in addition to or alternatively to the mineral oils described herein, as may be hydrocarbon condensation products. Additionally, synthetic mineral oils, such as hydrogenated polyalphaolefins, and other synthetically derived saturated hydrocarbons may be of utility to practice the methods herein.

In one non-limiting embodiment, the breaking or viscosity reduction is triggered or initiated by heat. These mineral, plant, and animal oils will slowly, upon heating, break or reduce the viscosity of the VES gel with the addition of or in the absence of any other viscosity reducing agent. The amount of internal breaker (mineral oil, e.g.), needed to break a VES-gelled fluid may in some cases be temperature dependent, with less needed as the fluid temperature increases. For mineral oil, the kinematic viscosity, molecular weight distribution, and amount of impurities (such as aromatics, olefins, and the like) also appear to influence the rate in which a mineral oil will break a VES-gelled fluid at a given temperature. For unsaturated fatty acid oils the type and amount of unsaturation (i.e. double carbon bonds) appears to be the major influence on the rate at which the fatty acid oil will break the VES-gelled fluid at a given temperature. Once a fluid is completely broken at an elevated temperature and cooled to room temperature a degree of viscosity reheal may occur but in most cases no rehealing is expected. The effective amount of mineral oil, plant oil and/or fish oil ranges from about 0.1 to about 15 gptg based on the total fluid, in another non-limiting embodiment from a lower limit of about 0.5 gptg, where "total fluid" means overall VES gelled fluid with all components of the particular embodiment. Independently the upper limit of the range may be about 10 gptg based on the total fluid. (It will be appreciated that units of gallon per thousand gallons (gptg) are readily converted to SI units of the same value as, e.g. liters per thousand liters, $m^3/1000\,m^3$, etc.)

Controlled viscosity reduction rates can be achieved at a temperature of from about 70° F. to about 400° F. (about 21 to about 204° C.), and alternatively at a temperature of from about 100° F. independently to an upper end of the range of about 280° F. (about 38 to about 138° C.), and in another non-limiting embodiment independently up to about 300° F. (149° C.). In one non-limiting embodiment, the fluid designer would craft the fluid system in such a way that the VES gel would break at or near the formation temperature after acidizing was accomplished.

In one non-limiting embodiment, fluid internal breaker design would be based primarily on formation temperature, i.e. the temperature the fluid will be heated to naturally in the formation once the acidizing treatment is over. Fluid design may take into account the expected duration or exposure of the fluid at formation temperature during a treatment. In the middle to latter acidizing stages the treating fluid may only experience actual reservoir temperature for 10% to 50% of the job time, since such fluids are pumped towards the end of the acidizing treatment and will contact the reservoir for a relatively shorter period of time. There would generally be no additional temperature or heating the VES fluid would see or experience other than original reservoir temperature.

It is sometimes difficult to specify with accuracy in advance the amount of the various breaking components that should be added to a particular aqueous fluid gelled with viscoelastic surfactants to sufficiently or fully break the gel, in general. For instance, a number of factors affect this proportion, including but not necessarily limited to, the particular VES used to gel the fluid; the particular breaker used (e.g. mineral, plant, and/or fish oil, unsaturated fatty acid, etc.); the temperature of the fluid; the downhole pressure of the fluid, the starting pH of the fluid; and the complex interaction of these various factors. Nevertheless, in order to give an approximate feel for the proportions of the various breaking components to be used in the method of the invention, approximate ranges will be provided. In an alternative, non-limiting embodiment the amount of mineral oil that may be effective in the invention may range from about 5 to about 25,000 ppm, based on the total amount of the fluid. In another non-restrictive version of the invention, the amount of mineral oil may range from a lower end of about 50 independently to an upper end of about 12,000 ppm.

The use of transition metal ion sources as breakers for VES-gelled fluids is more fully described in U.S. Ser. No. 11/145,630 filed Jun. 6, 2005, published as U.S. Patent Application Publication 2006/0041028, incorporated by reference herein in its entirety. Briefly, the transition metal ion source used as an internal breaker may include a transition metal salt or transition metal complex, where the transition metal may be from Groups VA, VIA, VIIA, VIIIA, IB, IIB, IIIB, and IVB of the Periodic Table (previous IUPAC American Group notation). One or more chelating agents and/or one or more reducing agent source may also be used in conjunction with the transition metal ion sources as breaking agents. In one non-limiting embodiment, the amount of transition metal ion from the transition metal ion source ranges from about 0.01 to about 300 ppm, based on the total fluid.

The use of saponified fatty acids as breakers for VES gelled aqueous fluids as breakers is more fully described in U.S. Ser. No. 11/372,624 filed Mar. 10, 2006, published as U.S. Patent Application Publication 2006/0211775, incorporated by reference herein in its entirety. Briefly, the saponified fatty acids are soap reaction products of a fatty acid with an alkaline compound selected from the group consisting of organic bases, alkali metal bases, alkaline earth metal bases, ammonium bases, and combinations thereof. The soap reaction products may be pre-formed prior to addition as an internal breaker, or may be formed in situ. Suitable fatty acids include, but are not limited to those found in plant oils and animal oils. Suitable alkali metal bases, alkaline earth metal bases and ammonium bases include, but are not necessarily limited to oxides and hydroxides of cations of the group including Na, K, Cs, Ca, Mg, Ba, Fe, Mn, Cu, Zn, Zr, Mo, V, Co, Al, Sn, $NH_4$, $(CH_3)_4N$, and mixtures thereof. Suitable organic bases include, but are not necessarily limited to, diethanolamine, triethanolamine, choline bases and mixtures thereof. In one non-restrictive embodiment herein, the amount of saponified fatty acid that is effective as a viscosity breaker ranges from about 50 to about 20,000 ppm based on the total viscoelastic surfactant gelled fluid.

The use of the disclosed breaker systems is ideal for controlling viscosity reduction of VES based acid diverting treating fluids. The breaking system may also be used for breaking gravel pack fluids, fracturing fluids, acidizing or near-wellbore clean-up fluids, and loss circulation pill fluids composed of VES. The breaker system may additionally work for foamed fluid applications (hydraulic fracturing, acidizing, and the like), where $N_2$ or $CO_2$ gas is used for the gas phase. This VES breaking methods herein are a significant improvement in that it gives breaking rates for VES based fluids that the industry is accustomed to with conventional polymer based fluids, such as borate crosslinked guar and linear HEC (hydroxyethylcellulose). Potentially more importantly, the use of these internal breaker systems in combination with external downhole breaking conditions should help assure and improve hydrocarbon production compared to prior art that uses only external mechanisms to break the VES fluid for effective and complete VES fluid clean-up after a treatment.

In one non-limiting embodiment of the invention, the compositions herein will degrade the gel created by a VES in an aqueous fluid, by disaggregation or rearrangement of the VES micellar structure. However, the inventors do necessarily not want to be limited to any particular mechanism.

The viscoelastic surfactant gelled fluids herein also contain at least one viscosity enhancer. The viscosity enhancers herein also aid with fluid loss control. Suitable viscosity enhancers include, but are not limited to, pyroelectric particles, piezoelectric particles, and mixtures thereof. Details about the use of pyroelectric and piezoelectric particles may be found in U.S. patent application Ser. No. 11/608,035, incorporated by reference herein in its entirety. In one non-limiting theory or explanation, when the fluid containing the viscosity enhancers is heated and/or placed under pressure, the particles develop surface charges that associate, link, connect, or relate the VES micelles to one another thereby increasing the viscosity of the fluid. This is somewhat analogous to the way crosslinkers connect various polymer chains, but the way the viscosity enhancers associate the elongated or "worm-like" VES micelles is believed to be completely different.

Suitable viscosity enhancers include, but are not necessarily limited to, ZnO, berlinite ($AlPO_4$), lithium tantalate ($LiTaO_3$), gallium orthophosphate ($GaPO_4$), $BaTiO_3$, $SrTiO_3$, $PbZrTiO_3$, $KNbO_3$, $LiNbO_3$, $LiTaO_3$, $BiFeO_3$, sodium tungstate, $Ba_2NaNb_5O_5$, $Pb_2KNb_5O_{15}$, potassium sodium tartrate, tourmaline, topaz and mixtures thereof. An effective amount of the viscosity enhancer ranges from about 0.1 to about 500 pptg (about 0.012 to about 60 kg/m$^3$) based on the total aqueous viscoelastic treating fluid.

Additionally, the viscoelastic surfactant fluid of this invention may optionally also contain high temperature viscosity stabilizers. The viscosity stabilizers used herein would be in most cases for stabilizing or sustaining the VES fluid viscosity at elevated fluid temperatures, such as above 180° F. (82° C.), as contrasted with increasing the fluid viscosity like viscosity enhancers may do. Suitable viscosity stabilizers include, but are not limited to, magnesium oxide, magnesium hydroxide, calcium oxide, calcium hydroxide, sodium hydroxide, and the like. The select viscosity stabilizers may, in one non-limiting embodiment, have an average particle size of 500 nanometers or less, that is, to be preferably small enough to be non-pore plugging and thereby will remain with the VES diverter fluid wherever it goes during the acidizing treatment and during flowback. More information about using these oxides and hydroxides as high temperature viscosity stabilizers may be found in U.S. patent application Ser. No. 11/125,465 filed May 10, 2005 and U.S. Provisional Patent Application No. 60/845,916 filed Sep. 20, 2006, both of which are incorporated by reference herein in their entirety.

Any suitable mixing apparatus may be used to formulate the viscoelastic surfactant gelled fluid. In the case of batch mixing, the VES gelling agent, the optional viscosity enhancer and the aqueous fluid are blended for a period of time. There are select internal breakers that may be added during batch mixing (e.g. transitional metal ion source, vegetable, and/or animal oil, etc.) may be added during batch mixing or on the fly during the treatment. Alternately, select internal breakers are added after batch mixing or on the fly during the treatment (e.g. mineral oil, polyalphaolefins, etc.) The VES that is useful herein may be any of the VES systems that are familiar to those in the well service industry, and may include, but are not limited to, amines, amine salts, quaternary ammonium salts, amidoamine oxides, amine oxides, mixtures thereof and the like. Suitable amines, amine salts, quaternary ammonium salts, amidoamine oxides, and other surfactants are described in U.S. Pat. Nos. 5,964,295; 5,979,555; and 6,239,183, incorporated herein by reference in their entirety.

Viscoelastic surfactants improve the treating fluid performance through the use of a polymer-free system. These systems, compared to polymeric based fluids, can offer improved viscosity breaking, higher sand transport capability (where appropriate), are in many cases more easily recovered after treatment than polymers, and are relatively non-damaging to the reservoir with appropriate contact with sufficient quantity of reservoir hydrocarbons, such as crude oil and condensate. The systems are also more easily mixed "on the fly" in field operations and do not require numerous co-additives in the fluid system, as do some prior systems.

The viscoelastic surfactants suitable for use herein include, but are not necessarily limited to, non-ionic, cationic, amphoteric, and zwitterionic surfactants. Specific examples of zwitterionic/amphoteric surfactants include, but are not necessarily limited to, dihydroxyl alkyl glycinate, alkyl ampho acetate or propionate, alkyl betaine, alkyl amidopropyl betaine and alkylimino mono- or di-propionates derived from certain waxes, fats and oils. Quaternary amine surfactants are typically cationic, and the betaines are typically zwitterionic. The thickening agent may be used in conjunction with an inorganic water-soluble salt or organic additive such as phthalic acid, salicylic acid or their salts.

Some non-ionic fluids are inherently less damaging to the producing formations than cationic fluid types, and are more efficacious per pound than anionic gelling agents. Amine oxide viscoelastic surfactants have the potential to offer more gelling power per pound, making it less expensive than other fluids of this type.

The amine oxide gelling agents RN⁺(R')₂O⁻ may have the following structure (I):

where R is an alkyl or alkylamido group averaging from about 8 to 24 carbon atoms and R' are independently alkyl groups averaging from about 1 to 6 carbon atoms. In one non-limiting embodiment, R is an alkyl or alkylamido group averaging from about 8 to 16 carbon atoms and R' are independently alkyl groups averaging from about 2 to 3 carbon atoms. In an alternate, non-restrictive embodiment, the amidoamine oxide gelling agent is Akzo Nobel's Aromox® APA-T formulation, which should be understood as a dipropylamine oxide since both R' groups are propyl.

Materials sold under U.S. Pat. No. 5,964,295 include ClearFRAC™, which may also comprise greater than 10% of a glycol. One preferred VES is an amine oxide. As noted, a particularly preferred amine oxide is APA-T, sold by Baker Oil Tools as SurFRAQ™ VES. SurFRAQ is a VES liquid product that is 50% APA-T and greater than 40% propylene glycol. These viscoelastic surfactants are capable of gelling aqueous solutions to form a gelled base fluid. The additives of this invention are used to prepare a VES system sold by Baker Oil Tools as DiamondFRAQ™. Diamond FRAQ™ with its assured breaking technology overcomes reliance on external reservoir conditions in order to break, as compared with products such as ClearFRAC™.

The methods and compositions herein also cover commonly known materials as Aromox® APA-T manufactured by Akzo Nobel and other known viscoelastic surfactant gelling agents common to stimulation treatment of subterranean formations.

The amount of VES included in the acid treating fluid depends on at least two factors. One involves generating enough viscosity to control the rate of fluid leak off into the pores of the reservoir or fracture, and the second involves creating a viscosity high enough to divert the fresh or unused acid in the fluid during the fluid introduction or injecting step, in the non-limiting case of a treating fluid. Thus, depending on the application, the VES is added to the aqueous fluid in concentrations ranging from about 0.5 to 25% by volume, alternatively up to about 12 vol % of the total aqueous fluid (from about 5 to 120 gptg). In another non-limiting embodiment, the range for the present formulations is from about 1.0 to about 6.0% by volume VES product. In an alternate, non-restrictive form of the invention, the amount of VES ranges from a lower limit of about 2 independently to an upper limit of about 10 volume %.

In one non-limiting embodiment, the VES-based acid diverter fluid may be used as a foamed diverter fluid, that is, since the fluid contains a significant amount of a foamable surfactant, such as amine oxide surfactants in one non-restrictive case, the diverter fluid may be energized by gases (i.e. may contain a gas phase for better or more distribution), such as CO₂ and N₂ and the like during the acid treatment. The acid fluid stages may or may not be foamed or energized like the diverter stages, in this particular embodiment of the invention.

It is expected that the breaking compositions of this invention can be used to reduce the viscosity of a VES-gelled aqueous fluid regardless of how the VES-gelled fluid is ultimately utilized. For instance, the viscosity breaking compositions could be used in all VES applications including, but not limited to, VES-gelled friction reducers, VES viscosifiers for loss circulation pills, fracturing fluids (including foamed fracturing fluids), gravel pack fluids, VES viscosifiers used to clean up drilling mud filter cake, remedial clean-up of fluids after a VES treatment (post-VES treatment) in regular or foamed fluid forms (i.e. the fluids may be "energized") with or the gas phase of foam being N₂ or CO₂, and the like.

Many types of acids may be used as the acid in the treatment method herein, which acids are diverted by the VES gelled fluids. Suitable acids include, but are not limited to, hydrochloric (HCl), hydrofluoric (HF), nitric, phosphoric, sulfuric, acetic formic, dicarboxylic acids, tricarboxylic acids, and the like and mixtures thereof. Typical examples of acid treatments include, but are not limited to:

a. HCl alone,
b. HCl followed by a mixture of HCl/HF,
c. Formic acid alone,
d. Formic followed by a mixture of formic/HF,
e. Acetic acid alone,
f. Acetic acid followed by a mixture of acetic/HF, and
g. Dicarboxylic acids (HTO (high temperature organic) acid).

It has been found that a particularly useful organic acid fluid Contains at least one water-soluble dicarboxylic acid. In one non-limiting embodiment herein, the dicarboxylic acid is of relatively low molecular weight, that is, has a formula weight of 175 or less. Suitable dicarboxylic acids therefore include, but are not necessarily limited to, oxalic acid (ethanedioic acid), malonic acid (propanedioic acid), succinic acid (butanedioic acid), glutaric acid (pentanedioic acid), adipic acid (hexanedioic acid), pimelic acid (heptanedioic acid), and mixtures thereof. In another, alternate embodiment of the invention, the dicarboxylic acids are selected from the group consisting of succinic acid, glutaric acid, adipic acid, and mixtures thereof. Interestingly, glutaric acid, succinic acid, and adipic acid have been used as components for corrosion inhibitors for ferrous metals, according to U.S. Pat. No. 4,512,552. Mixtures of succinic acid, glutaric acid, and adipic acid are generally available as a by-product stream. More information may be found in U.S. Pat. No. 6,805,198 to Huang, et al. assigned to Baker Hughes Incorporated, and incorporated herein by reference in its entirety.

The organic acid fluid systems herein can effectively generate wormholes and flow paths to stimulate production in subterranean carbonate formations and dissolve carbonate scale. Further, these organic acids mixed with hydrofluoric acid can effectively remove fines to recover production in sandstone formations at elevated temperatures. These fluids have very low corrosion of the tubing, casing and down hole equipment.

Based on the properties of glutaric acid, succinic acid and adipic acid, this composition of dicarboxylic acids and other combinations of dicarboxylic acids (or single dicarboxylic acids used alone) can be used as acid compositions to stimulate high temperature wells, according to the methods herein. A series of tests done on screens and clay-rich cores show that this organic acid system, which is advantageously highly biodegradable, can successfully remove the calcium carbonate scale and fines to stimulate production. Core flood testing demonstrates that this organic acid system can effectively remove calcium carbonate scales and fines at temperatures up to 400° F. (204° C.). In addition to its reactivity, the acid system, when combined with corrosion inhibitor, exhibits very low corrosion at high temperatures. Corrosion tests show that at 350° F. (177° C.) the corrosion rate caused by this organic acid system is 0.001 lbs/ft² (0.005 kg/m²) on 22-Cr for 16 hours. Acid soaking to completely remove scale prior to removal of fines is now possible at temperatures in excess of 100° F. (38° C.), and in particular 200° F. (92° C.). In one non-limiting embodiment of the invention, a preferred operating temperature range is between about 300° F. (149° C.) and about 350° F. (177° C.). Successive removal of plugging fines from screens can then proceed without further damage to the integrity of the screen.

Suitable solvents or diluents for the acid portions of the compositions herein include, but are not necessarily limited to, water, methanol, isopropyl alcohol, alcohol ethers, aromatic solvents, glycols, and mixtures thereof. In one non-limiting embodiment of the invention, the composition has an absence of monocarboxylic acids and/or an absence of tricarboxylic acids. Alternatively, in another embodiment of the invention, the acid composition has an absence of quaternary ammonium compounds and/or an absence of sulfur-containing corrosion inhibitor activator (e.g. thioglycolic acid, alkali metal sulfonate, etc.). In one non-limiting embodiment it may be desirable to avoid the use of strong mineral acids, such as HCl and/or $H_2SO_4$, so these acids should be absent from the acid composition in one preferred, alternate embodiment of the methods herein. The acid compositions of the present invention are intended to replace the mineral acid systems previously used, in one non-limiting aspect herein. The optional use of hydrofluoric acid (noted above) is an exception to these considerations about mineral acids.

The viscosity of the VES diverter fluid is not ordinarily broken by the following acid if the acid is a mineral-type acid. The VES viscosity may in some cases actually increase by contact with mineral acid. However, some of the first portion of VES diverter may break rapidly once it is contacted and mixed with an organic acid. In the case of organic acid, the amount of organic acid needed would be largely temperature dependant, but likely at least a 0.3% HTO content, and most likely a 0.5-1.0% HTO content is needed before the diverter fluid viscosity will decrease. Thus, the pseudo-filter cake would hold up to mineral acid but not as well to organic acid, it is expected. That being the case, more matrix penetration of a VES diverter fluid that has high viscosity at low shear rates (i.e. use of viscosity enhancers) would be the best design for diverting organic acids. Additionally, a brine spacer fluid may also be used immediately after the diverter fluid stages (such as 2% KCl, 3% $NH_4Cl$ and the like) to limit the mineral or organic acid stages from contacting and mixing with the diverter fluid stages.

The viscoelastic surfactant gelled fluids herein may also contain optional fluid loss control agents, although as noted above, some of the components such as the viscosity enhancers already discussed function as fluid loss control agents. Suitable fluid loss agents would include, but not necessarily be limited to alkaline earth metal oxides, alkaline earth metal hydroxides, transition metal oxides, transition metal hydroxides, and mixtures thereof, such as MgO, ZnO and the like. More information on these fluid loss control agents may be found in U.S. Provisional patent application no. 60/815,693 incorporated by reference herein in its entirety. Improving or increasing fluid loss may also be accomplished by increasing the concentration or use of the nano-sized particles that enhance viscosity. Increasing the concentration of these particles will eventually be enough particles to allow the build up of: 1) higher fluid viscosity for reservoir matrix viscosity improvement; and for 2) development of mostly an "external viscous VES fluid layer" on the formation, that is, a pseudo-filter cake (in contrast to a true filter cake that often extends into the formation with potential for damaging the formation). The combination of both can occur, that is, an internal/matrix of the pore-type viscosity fluid loss control and external pseudo-filtercake development. The amount of fluid loss control agent may be adjusted to have less in the first portion of a specific diverter fluid stage and more added in the later portion of the same diverter fluid stage. This procedure would allow some fluid loss control agent to go in before the external pseudo-filter cake fully forms and to thus divert the acid(s) that trail behind. In one non-limiting embodiment, the amount of fluid loss control agent ranges from about 2 to about 200 pptg (about 0.2 to about 24 kg/m³) based on the VES gelled fluid. It may be realized that certain materials, e.g. alkali metals and alkaline earth metals, may serve and function as both "high temperature viscosity stabilizers" and as fluid loss agents within the fluids of the invention herein.

It is expected in one non-limiting embodiment that the fluid loss control agents would be primarily the nano-sized particles discussed above for fluid loss control and viscosity enhancing. Increasing the amount of these agents increases the building of pseudo-filter cake. These particles include, but are not necessarily limited to the piezo- and pyroelectric particles, optionally in nano-sized form. Coarser or larger-sized transition metal oxide and/or transition metal hydroxides such as MgO may also be used alone or together with the nano-sized particles discussed immediately above. These coarser or larger-sized transition metal oxide and/or transition metal hydroxides may also be used in the latter part of a diverter slug not to penetrate the formation, but to build a pseudo-filter cake or temporary barrier or block. The transition metal oxide and/or transition metal hydroxides may also be used to neutralize some or all of the acid fluid when the acid fluid contacts the diverter fluid.

A value of the compositions and methods herein is that a VES-based acid diverter fluid may be designed to have enhanced breaking characteristics. That is, fluid breaking is no longer solely dependant on external reservoir conditions for viscosity break and is controllable: the rate of viscosity reduction, if complete break is achieved or approached, occurs throughout the reservoir interval, and the amount of reservoir pressure required to displace the VES-based fluid is significantly reduced. Importantly, better clean-up of the VES fluid from the formation and wellbore can be achieved thereby. Better clean-up of the VES directly influences the success of the acid treatment, which is an enhancement of the well's hydrocarbon productivity. VES fluid clean-up limitations and failures of the past can now be overcome or improved by the use of fluid compositions disclosed herein.

In order to practice the method of the invention, an aqueous treating fluid, as a non-limiting example, is first prepared by blending a viscosity enhancer, a VES gelling agent, and an internal breaker into an aqueous fluid. The aqueous fluid could be, for example, water, brine, seawater, or mixtures thereof. Any suitable mixing apparatus may be used for this procedure. In one non-limiting embodiment, in the case of batch mixing, the viscosity enhancer, VES gelling agent, and the aqueous fluid are blended for a short period of time sufficient to mix the components together, such as for 15 minutes to 1 hour, and the internal breaker may be added just prior to use. In another non-limiting embodiment all of the viscosity enhancer, VES gelling agent and the internal breaking composition may be added to the aqueous fluid on the fly, during a treatment.

The base fluid can also contain other conventional additives common to the well service industry such as water wetting surfactants, non-emulsifiers, scale inhibitors, and the like. As noted herein, the base fluid can also contain other non-conventional additives which can contribute to the breaking action of the VES fluid, and which are added for that purpose in one non-restrictive embodiment.

Any or all of the above internal breakers (e.g. mineral, vegetable, and animal oils) may be provided in an extended release form such as encapsulation by polymer or otherwise, pelletization with binder compounds, absorbed or some other method of layering on a microscopic particle or porous substrate, and/or a combination thereof. Specifically, the internal breakers (in non-restrictive embodiments mineral, plant and/or fish oils) may be micro- and/or macro-encapsulated to permit slow or timed release thereof. In non-limiting examples, the coating material may slowly dissolve or be removed by any conventional mechanism, or the coating could have very small holes or perforations therein for the mineral oils within to diffuse through slowly. For instance, a mixture of fish gelatin and gum acacia encapsulation coating available from ISP Hallcrest, specifically Captivates® liquid encapsulation technology, can be used to encapsulate the internal breakers herein (e.g. mineral, plant, fish, synthetic and other saturated oils). Also, polymer encapsulation coatings such as used in fertilizer technology available from Scotts Company, specifically POLY-S® product coating technology, or polymer encapsulation coating technology from Fritz Industries could possibly be adapted to the methods of this invention. The mineral oils could also be absorbed onto zeolites, such as Zeolite A, Zeolite 13X, Zeolite DB-2 (available from PQ Corporation, Valley Forge, Pa.) or Zeolites Na-SKS5, Na-SKS6, Na-SKS7, Na-SKS9, Na-SKS10, and Na-SKS13, (available from Hoechst Aktiengesellschaft, now an affiliate of Aventis S.A.), and other porous solid substrates such as MICROSPONGE™ (available from Advanced Polymer Systems, Redwood, Calif.) and cationic exchange materials such as bentonite clay or placed within microscopic particles such as carbon nanotubes or buckminster fullerenes. Further, the mineral oils may be both absorbed into and onto porous or other substrates and then encapsulated or coated, as described above.

In a typical acidizing operation, the acid treating fluid of the invention is pumped at a rate sufficient to effectively contact the formation. A typical acidizing treatment would be conducted by mixing a 20.0 to 60.0 gallon/1000 gal water (60.0 liters/1000 liters) amine oxide VES, such as SurFRAQ, in a brine such as 2% (w/v) (166 lb/1000 gal, 19.9 kg/m$^3$) KCl solution or 3% $NH_4Cl$ solution and the like at a pH ranging from about 4.0 to about 9.5, where the acid fluid stage of the treatment is injected downhole after the VES gelled diverter fluid. The breaking component may be added after the VES addition using appropriate mixing and metering equipment.

In one embodiment herein, the methods and compositions herein are practiced in the absence of gel-forming polymers and/or gels or aqueous fluids having their viscosities enhanced by polymers. However, combination use of the compositions and methods herein with polymers and polymer breakers may also be of utility. For instance, polymers may also be added to the VES fluid herein for fluid loss control purposes. Types of polymers that may serve as fluid loss control agents include, but are not necessarily limited to, various starches, modified starches, polyvinyl acetates, polylactic acid, guar and other polysaccharides, hydroxyethylcellulose and other derivatized celluloses, gelatins, and the like.

The present invention will be explained in further detail in the following non-limiting Examples that are only designed to additionally illustrate the invention but not narrow the scope thereof.

GENERAL PROCEDURE FOR EXAMPLES 1-6

To a blender were added tap water, optional viscosity enhancer (if any), followed by 4 vol %-viscoelastic surfactant (WG-3L—Aromox® APA-T available from Akzo Nobel). The blender was used to mix the components on a very slow speed, to prevent foaming, for about 30 minutes to form a 4% bv VES base fluid and internal breaker was then added and mixed into the VES fluid for an additional 5 minutes for preparing the diverter fluid. Since a goal of the research was to find a relatively rapid gel breaking composition, samples were only observed for 3 hours or less, as indicated.

Examples 1

Figure 1:
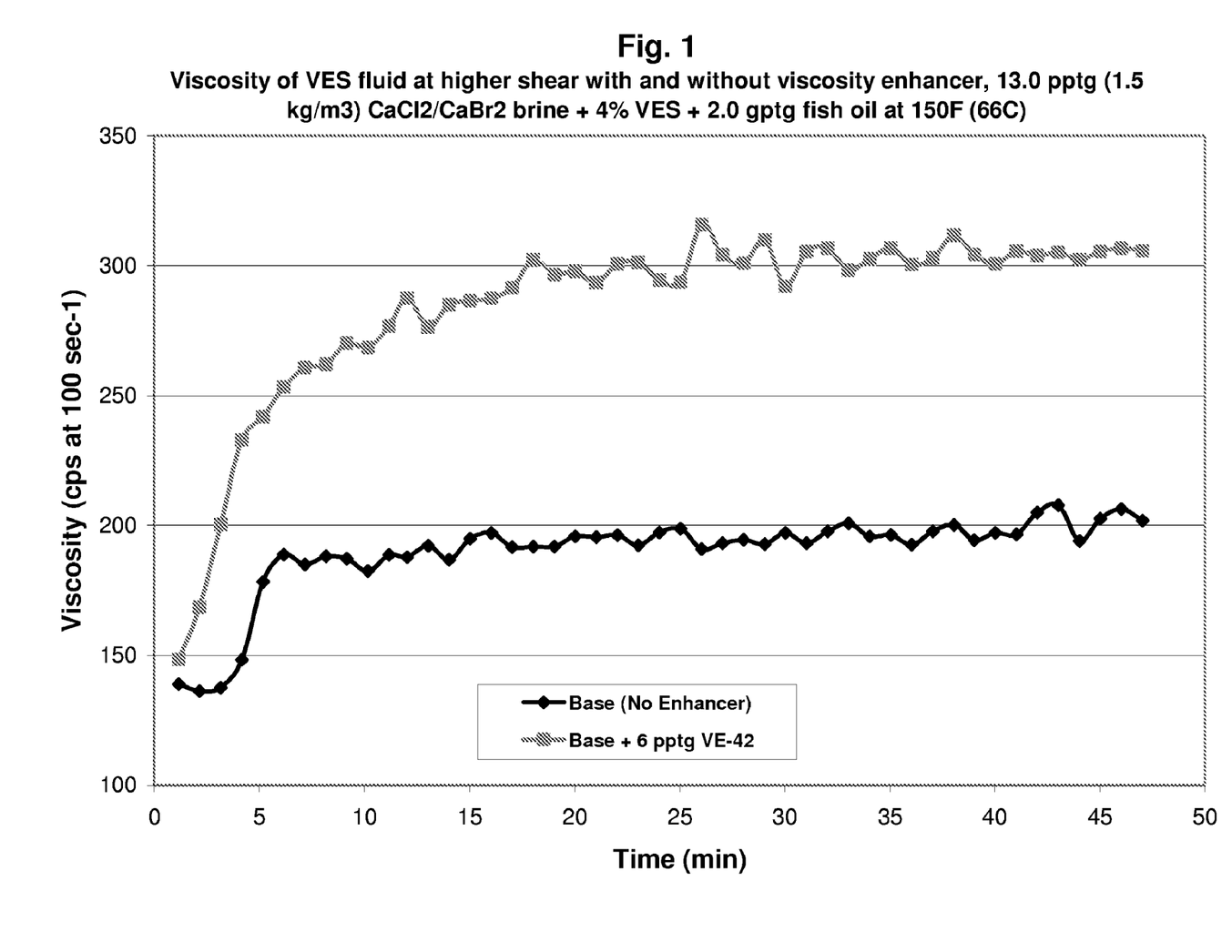
FIG. 1 is a graph of the viscosity of a VES gelled fluid, 13.0 pptg (1.5 kg/m$^3$) CaCl$_2$/CaBr$_2$ brine with 4% VES at 150° F. (66° C.) and 2.0 gptg fish oil breaker, with and without 6 pptg (0.7 kg/m$^3$) VE-42 (nano-sized ZnO viscosity enhancing particles) as a function of time.

Shown in FIG. 1 is a graph of the viscosity of a VES gelled fluid, 13.0 pptg (1.5 kg/m$^3$) $CaCl_2/CaBr_2$ brine with 4% VES at 150° F. (66° C.) and 2.0 gptg fish oil breaker. The two graphs are with and without 6 pptg (0.7 kg/m$^3$) VE-42 (nano-sized ZnO viscosity enhancing particles) as a function of time. It may be seen that the fluid with the VE-42 viscosity enhancer had noticeably increased viscosity as compared with the fluid with no viscosity enhancer; thus the viscosity enhancers herein do increase the viscosity of the VES gelled fluid and enhance and increase their ability to serve as diverting fluids.

Example 2

Figure 2:
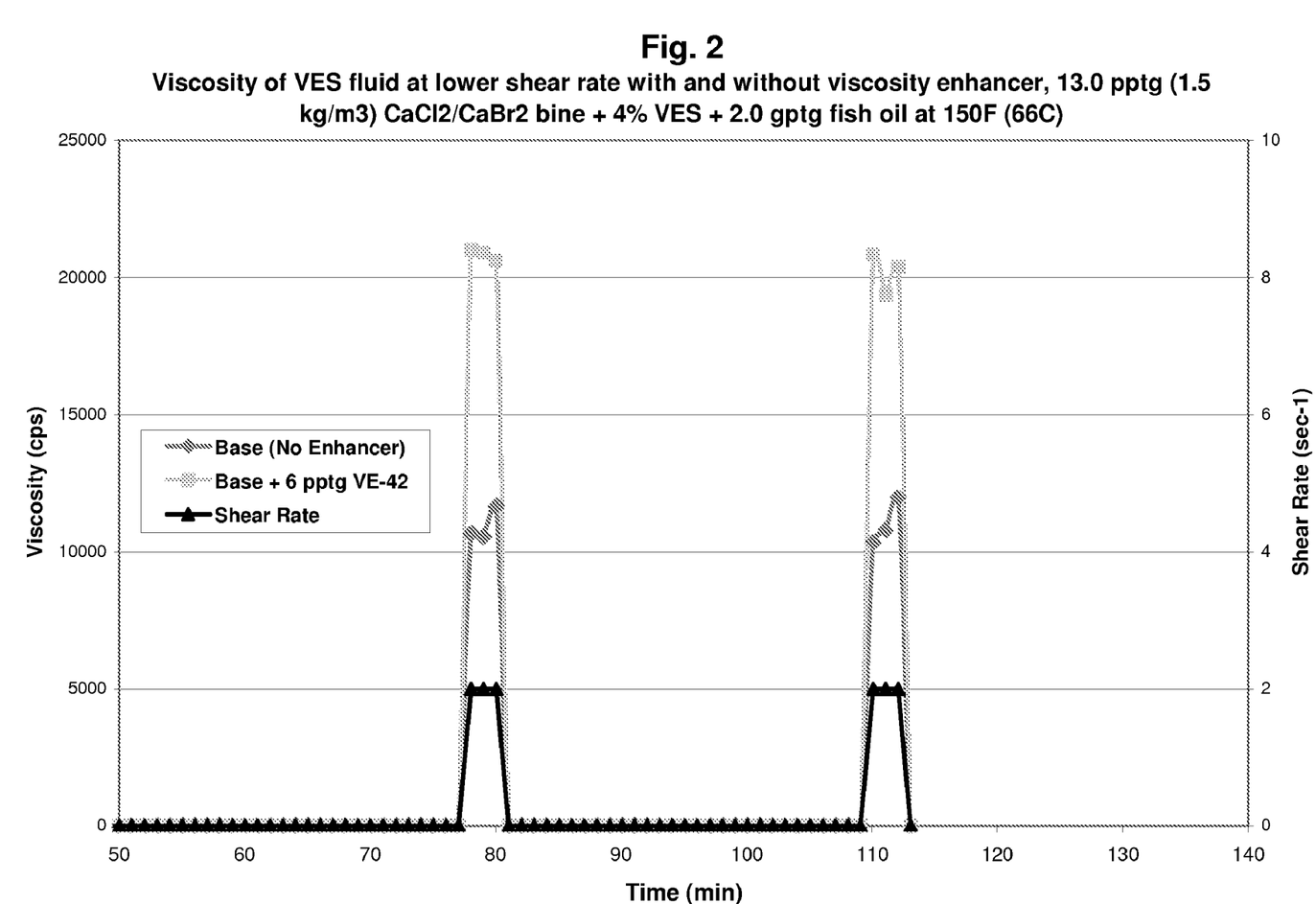
FIG. 2 is a graph of the viscosity of the VES gelled fluids of FIG. 1 as a function of time and shear rate.

Similar results from FIG. 1 are shown for the Example 2 fluids in FIG. 2. FIG. 2 is graph of the viscosity of the VES gelled fluids of FIG. 1 as a function of time and shear rate, again showing that the fluid with 6 pptg (0.7 kg/m$^3$) VE-42 particles has increased viscosity, particularly at the shear rates indicated.

Example 3

Figure 3:
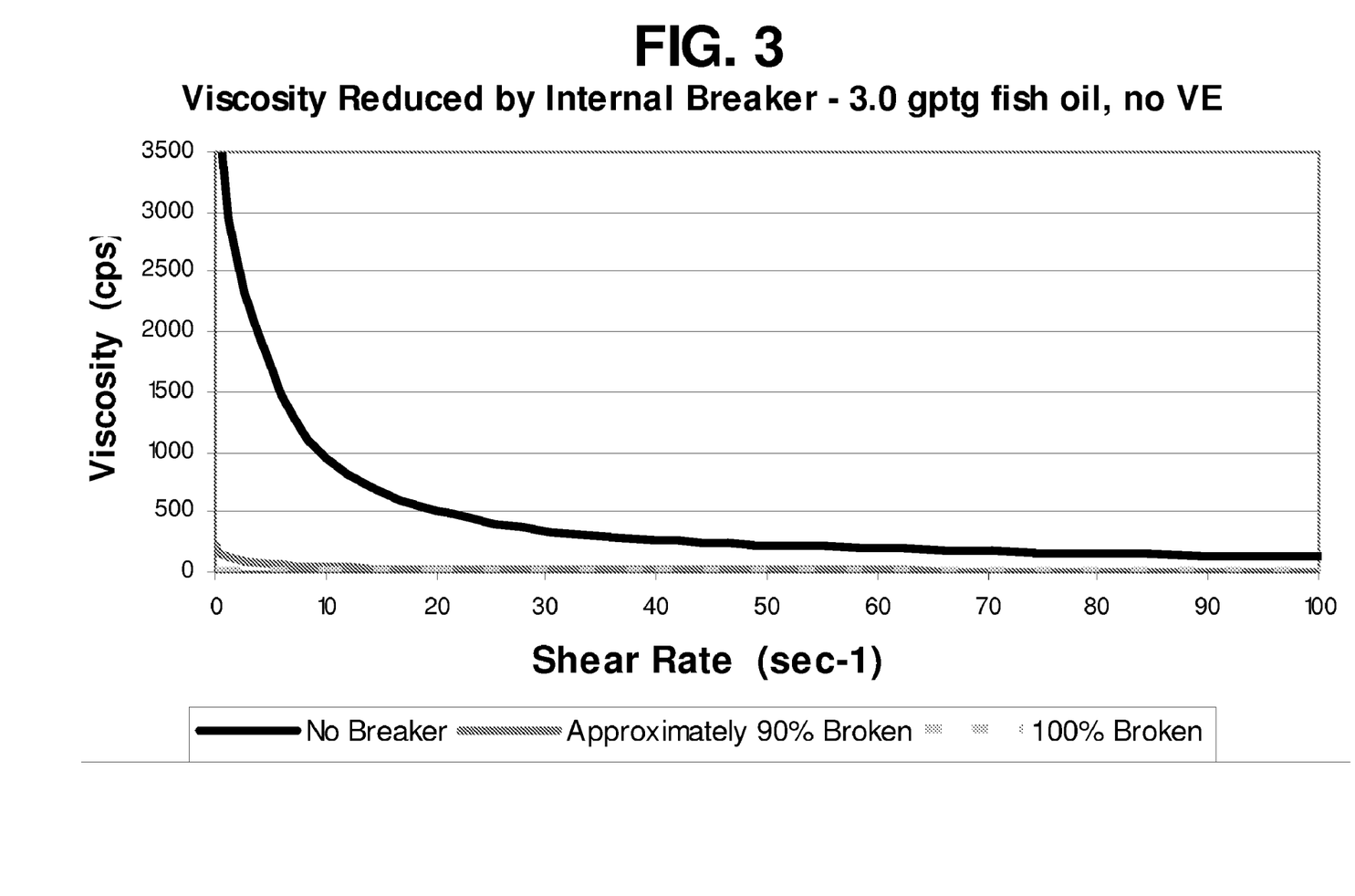
FIG. 3 is a graph of the viscosity of a VES gelled fluid containing 3.0 gptg fish oil internal breaker and no viscosity enhancer as a function of shear rate, after different break times.

FIG. 3 is graph of the viscosity of a VES gelled fluid containing 3.0 gptg fish oil internal breaker and no viscosity enhancer as a function of shear rate, after different break times. One fluid was allowed to break over approximately 8 hours and the completely broken fluid was allowed to break for 24 hours before measurements. No viscosity enhancer was used in the internal break tests of FIG. 3. This Example demonstrates that the viscosity of the VES gelled fluids herein may be reduced completely using the internal breakers herein.

Example 4

Figure 4:
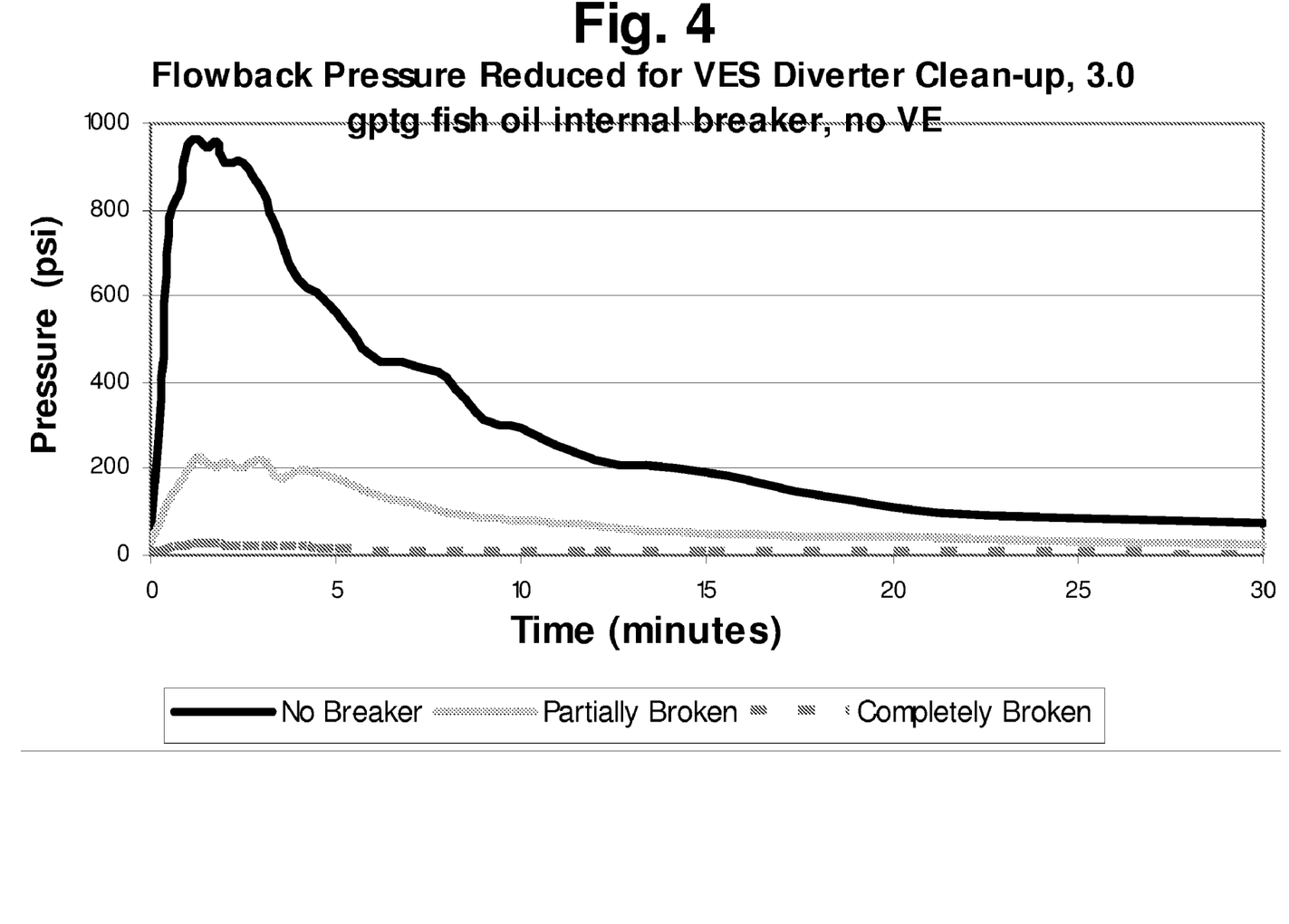
FIG. 4 is a graph of flowback pressure as a function of time for VES gelled fluids containing 3.0 gptg fish oil internal breaker and no viscosity enhancer illustrating that flowback pressure is reduced for VES diverter fluid clean-up.

FIG. 4 is a graph of flowback pressure as a function of time for VES gelled fluids containing 3.0 gptg fish oil internal breaker and no viscosity enhancer illustrating that flowback pressure is reduced for VES diverter fluid clean-up. One of the internal breaker tests, the partially broken one, was shut-in a core for 4 hours before displacement and the completely broken test was shut-in for 24 hours prior to measurements.

This Example demonstrates that the viscosity of the VES gelled fluids herein may be reduced completely using the internal breakers herein for improved and cleaner flowback of the VES-gelled fluid components after breaking.

Example 5

Figure 5:
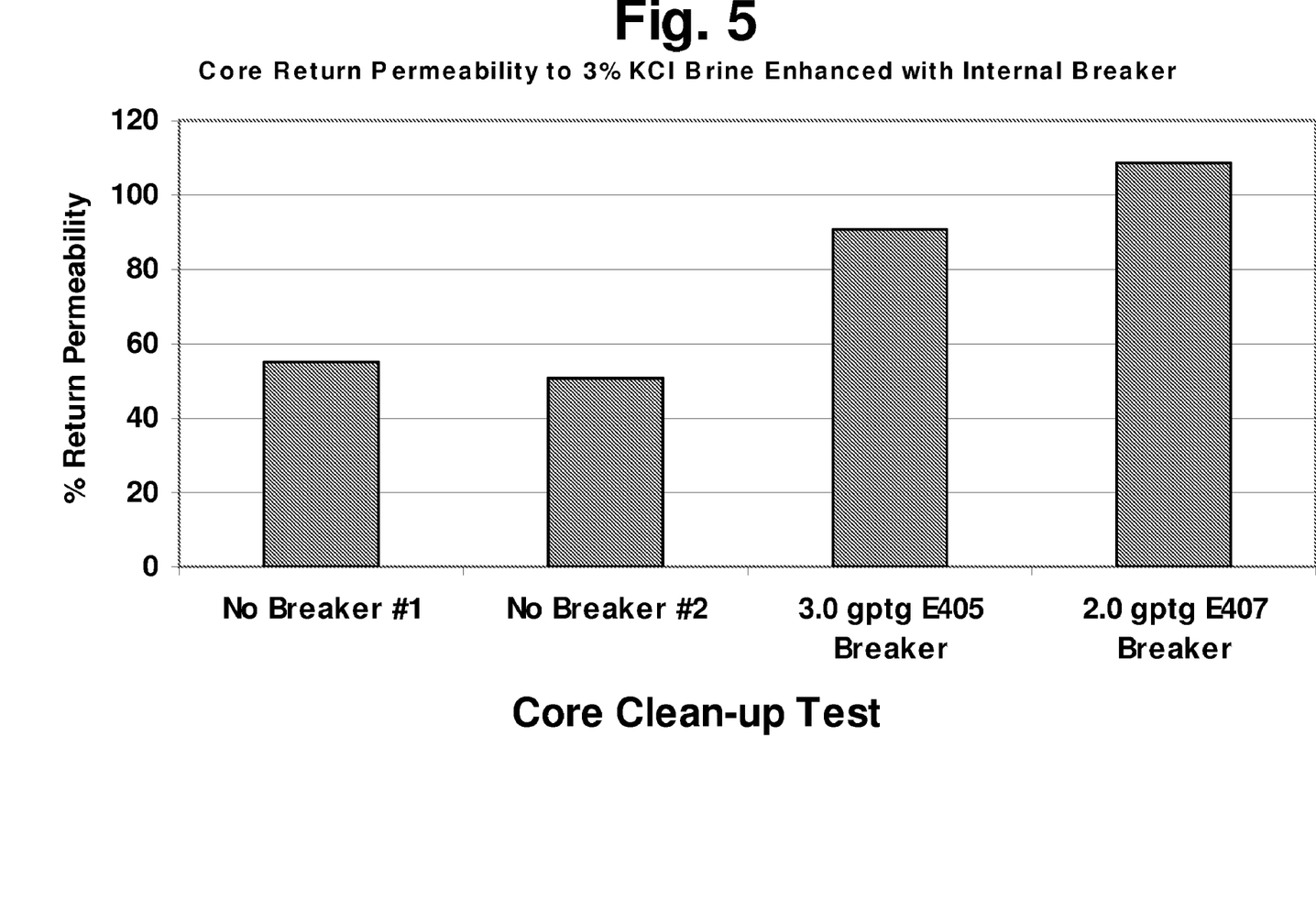
FIG. 5 is a graph of core return permeabilities for a VES gelled 3% KCl brine enhanced with the indicated quantities of fish oil internal breaker, or no breaker, where no viscosity enhancer was used for any of the fluids.

FIG. 5 is a graph of core return permeabilities for a VES gelled 3% KCl brine enhanced with the indicated quantities of internal breaker E405 and E407 (Flax Oil and Fish Oil 18:12TG respectively, both available from Bioriginal Food & Science Corp.), or no breaker, where no viscosity enhancer was used for any of the fluids. This graph illustrates that more complete returns are possible when the internal breakers of the compositions herein are used.

Example 6

Figure 6:
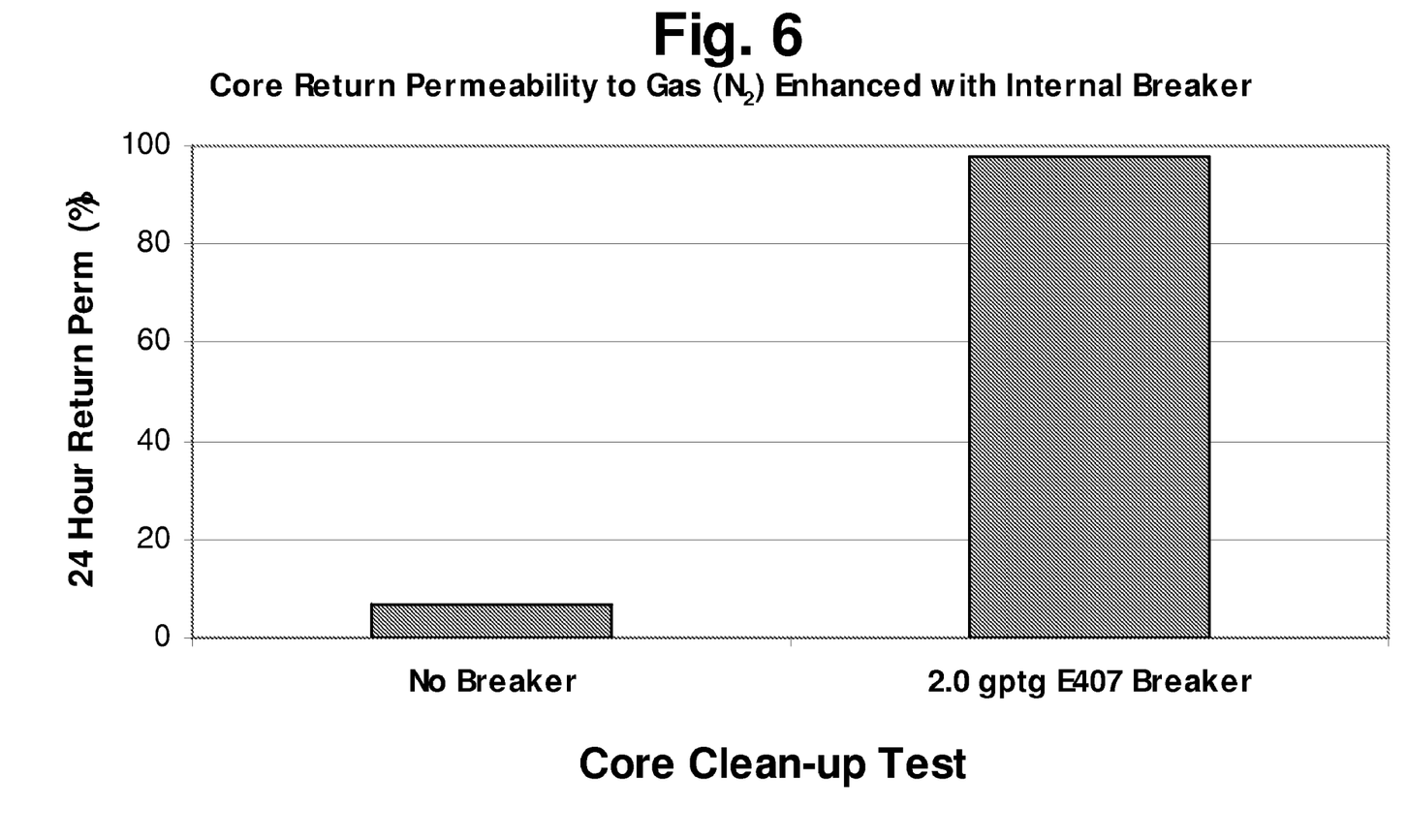
FIG. 6 is a graph of core return permeabilities to N$_2$ gas for a VES gelled fluid enhanced with the indicated quantities of fish oil internal breaker, or no breaker, where no viscosity enhancer was used for any of the fluids.

FIG. 6 is a graph of core return permeabilities for a VES gelled 3% KCl brine enhanced with the indicated quantities of fish oil internal breaker E407 (Fish Oil 18:12TG available from Bioriginal Food & Science Corp.), or no breaker, where no viscosity enhancer was used for any of the fluids. This graph illustrates that more complete returns are possible when the internal breakers of the compositions herein are used.

As may be seen, the method of gel breaking described herein is simple, effective, safe, and highly cost-effective. A method is provided for breaking the viscosity of aqueous acidizing diverter treatment fluids gelled with viscoelastic surfactants (VESs). Compositions and methods are also furnished herein for breaking VES-surfactant fluids controllably, completely and relatively quickly.

Compositions and methods are also disclosed herein for breaking VES-surfactant fluids where contact with reservoir fluids' external breaking mechanism is not required, although in some embodiments heat from the reservoir may help the breaking process. Compositions and methods are additionally provided for breaking VES-surfactant fluids where the breaking additive is in a phase internal to the VES-surfactant fluid. Further, methods and VES fluid compositions are described herein for breaking the viscosity of aqueous fluids gelled with viscoelastic surfactants using readily available materials at relatively inexpensive concentrations.

As used herein, the word "comprising" as used throughout the claims is to be interpreted to mean "including but not limited to".

In the foregoing specification, the invention has been described with reference to specific embodiments thereof, and has been demonstrated as effective in providing methods and compositions for using VES-gelled aqueous fluids to acidize subterranean formations where the fluid has an internal breaker mechanism. However, it will be evident that various modifications and changes can be made thereto without departing from the broader spirit or scope of the invention as set forth in the appended claims. Accordingly, the specification is to be regarded in an illustrative rather than a restrictive sense. For example, specific combinations of viscoelastic surfactants, internal breakers, viscosity enhancers, fluid loss control agents, and other components falling within the claimed parameters, but not specifically identified or tried in a particular composition or fluid, are anticipated to be within the scope of this invention. Further, the aqueous VES-gelled fluids containing internal breakers and optionally viscosity enhancers, fluid loss control agents, and optional high temperature stabilizers herein may be used as VES fracturing fluid treatments.

What is claimed is:

1. A method for directed placement of acid in a subterranean formation comprising:
    introducing a viscoelastic surfactant gelled fluid into a subterranean formation, where the viscoelastic surfactant gelled fluid comprises:
        water;
        at least one viscoelastic surfactant (VES) in an amount effective to increase the viscosity of the water; and
        at least one internal breaker selected from the group consisting of bacteria, transition metal ion sources, saponified fatty acids, mineral oils, hydrogenated polyalphaolefin oils, saturated fatty acids, unsaturated fatty acids and combinations thereof; and
    subsequent to introducing the VES gelled fluid, introducing an acid into the subterranean formation to place it as at least partially directed by the VES gelled fluid; and
    reducing the viscosity of the VES gelled fluid with the internal breaker.

2. The method of claim 1 where the saponified fatty acids are soap reaction products of a fatty acid with an alkaline compound selected from the group consisting of organic bases, alkali metal bases, alkaline earth metal bases, ammonium bases, and combinations thereof.

3. The method of claim 1 where the unsaturated fatty acids are selected from the group consisting of monoenoic acids, polyenoic acids, and mixtures thereof.

4. The method of claim 1 where:
    when the internal breaker is bacteria, the amount of bacteria ranges from about 0.01 to about 20.0 vol %,
    when the internal breaker is a transition metal ion source, the amount of transition metal ion from the transition metal ion source ranges from about 0.01 to about 300 ppm,
    when the internal breaker is a saponified fatty acid, the amount of saponified fatty acid ranges from about 50 to about 20,000 ppm,
    when the internal breaker is selected from the group consisting of mineral oils, hydrogenated polyalphaolefin oils, saturated fatty acids, unsaturated fatty acids and combinations thereof, the amount of internal breaker ranges from about 0.1 to about 15 gptg;
all based on the VES gelled fluid.

5. The method of claim 1 further comprising heating the VES gelled fluid to a temperature effective to cause the internal breaker to reduce the viscosity of the VES gelled fluid.

6. The method of claim 5 where the effective temperature ranges from about 100 to about 400° F. (about 38 to about 204° C.).

7. The method of claim 1 where the internal breaker is a mineral oil and is at least about 99 wt % paraffin.

8. The method of claim 1 where the VES gelled fluid further comprises at least one viscosity enhancer selected from the group consisting of pyroelectric particles, piezoelectric particles, and mixtures thereof.

9. The method of claim 1 where the acid is selected from the group consisting of hydrochloric acid, hydrofluoric acid, formic acid, acetic acid, dicarboxylic acids, and mixtures thereof.

10. The method of claim 1 where the VES gelled fluid is a first VES gelled fluid and the acid is a first acid, and the method further comprises subsequently introducing a fluid selected from the group consisting of a second VES gelled fluid which may be different from or identical to the first VES gelled fluid, a second acid which may be different from or identical to the first acid, and mixtures thereof.

11. The method of claim 1 where in the VES gelled fluid:
   the at least one VES is present in an amount of from about 0.5 to 12.0 vol % of; and
   the viscosity enhancer is present in an amount of from about 0.1 to about 500 pptg (about 0.012 to about 60 kg/m³);
all based on the VES gelled fluid.

12. The method of claim 1 where the internal breaker is the only agent present in the VES gelled fluid that reduces viscosity.

13. The method of claim 1 where the internal breaker is present in an oil-soluble internal phase of the water of the VES gelled fluid.

14. The method of claim 1 where the VES gelled fluid further comprises a fluid loss control agent selected from the group consisting of alkaline earth metal oxides, alkaline earth metal hydroxides, transition metal oxides, transition metal hydroxides, and mixtures thereof.

15. The method of claim 14 where the effective amount of the fluid loss control agent ranges from about 2 to about 200 pptg (about 0.2 to about 24 kg/m³) based on the VES gelled fluid.

16. The method of claim 1 where a fluid loss control agent is introduced into the subterranean formation after the VES gelled fluid is introduced to build a pseudo-filter cake on the formation.

17. The method of claim 1 where the VES gelled fluid further comprises a viscosity stabilizer selected from the group consisting of magnesium oxide, magnesium hydroxide, calcium oxide, calcium hydroxide, sodium hydroxide, and mixtures thereof.

18. A method for directed placement of acid in a subterranean formation comprising:
   introducing a viscoelastic surfactant gelled fluid into a subterranean formation, where the viscoelastic surfactant gelled fluid comprises:
      water;
      at least one viscoelastic surfactant (VES) in an amount effective to increase the viscosity of the water;
      at least one internal breaker selected from the group consisting of bacteria, transition metal ion sources, saponified fatty acids, mineral oils, hydrogenated polyalphaolefin oils, saturated fatty acids, unsaturated fatty acids and combinations thereof; and
      at least one viscosity enhancer selected from the group consisting of pyroelectric particles, piezoelectric particles, and mixtures thereof;
   subsequent to introducing the VES gelled fluid, introducing an acid into the subterranean formation to place it as at least partially directed by the viscoelastic surfactant gelled fluid, where the acid is selected from the group consisting of hydrochloric acid, hydrofluoric acid, formic acid, acetic acid, dicarboxylic acids; and
   reducing the viscosity of the VES gelled fluid with the internal breaker.

19. The method of claim 18 where the saponified fatty acids are soap reaction products of a fatty acid with an alkaline compound selected from the group consisting of organic bases, alkali metal bases, alkaline earth metal bases, ammonium bases, and combinations thereof.

20. The method of claim 18 where the unsaturated fatty acids are selected from the group consisting of monoenoic acids, polyenoic acids, and mixtures thereof.

21. The method of claim 18 where:
   when the internal breaker is bacteria, the amount of bacteria ranges from about 0.01 to about 20.0 vol %,
   when the internal breaker is a transition metal ion source, the amount of transition metal ion from the transition metal ion source ranges from about 0.01 to about 300 ppm,
   when the internal breaker is a saponified fatty acid, the amount of saponified fatty acid ranges from about 50 to about 20,000 ppm,
   when the internal breaker is selected from the group consisting of mineral oils, hydrogenated polyalphaolefin oils, saturated fatty acids, unsaturated fatty acids and combinations thereof, the amount of internal breaker ranges from about 0.1 to about 15 gptg;
all based on the VES gelled fluid.

22. The method of claim 18 further comprising heating the fluid to a temperature effective to cause the breaker to reduce the viscosity of the gelled aqueous fluid.

23. The method of claim 22 where the effective temperature ranges from about 100 to about 400° F. (about 38 to about 204° C.).

24. The method of claim 18 where the internal breaker is a mineral oil and is at least about 99 wt % paraffin.

25. The method of claim 18 where the VES gelled fluid is a first VES gelled fluid and the acid is a first acid, and the method further comprises subsequently introducing a fluid selected from the group consisting of a second VES gelled fluid which may be different from or identical to the first VES gelled fluid, a second acid which may be different from or identical to the first acid, and mixtures thereof.

26. The method of claim 18 where in the VES gelled fluid:
   the at least one VES is present in an amount of from about 0.5 to 12.0 vol % of; and
   the viscosity enhancer is present in an amount of from about 0.1 to about 500 pptg (about 0.012 to about 60 kg/m³) of;
all based on the VES gelled fluid.

27. The method of claim 18 where the internal breaker is the only agent present in the VES gelled fluid that reduces viscosity.

28. The method of claim 18 where the internal breaker is present in an oil-soluble internal phase of the water of the VES gelled fluid.

29. The method of claim 18 where the VES gelled fluid further comprises a fluid loss control agent selected from the group consisting of alkaline earth metal oxides, alkaline earth metal hydroxides, transition metal oxides, transition metal hydroxides, and mixtures thereof.

30. The method of claim 29 where the effective amount of the fluid loss control agent ranges from about 2 to about 200 pptg (about 0.2 to about 24 kg/m³) based on aqueous viscoelastic treating fluid.

31. The method of claim 18 where a fluid loss control agent is introduced into the subterranean formation after the VES gelled fluid is introduced to build a pseudo-filter cake on the formation.

32. The method of claim 18 where the VES gelled fluid further comprises a viscosity stabilizer selected from the group consisting of magnesium oxide, magnesium hydroxide, calcium oxide, calcium hydroxide, sodium hydroxide, and mixtures thereof.

33. A method for directed placement of acid in a subterranean formation comprising:
introducing a viscoelastic surfactant gelled fluid into a subterranean formation, where the viscoelastic surfactant (VES) gelled fluid comprises:
water;
from about 0.5 to 12.0 vol % of at least one VES in an amount effective to increase the viscosity of the water, based on the total VES gelled fluid;
at least one internal breaker; and
from about 0.1 to about 500 pptg (about 0.012 to about 60 kg/m$^3$) of at least one viscosity enhancer, based on the total viscoelastic surfactant gelled fluid, where the viscosity enhancer is selected from the group consisting of pyroelectric particles and piezoelectric particles;
subsequent to introducing the viscoelastic surfactant gelled fluid, introducing an acid into the subterranean formation to place it as at least partially directed by the viscoelastic surfactant gelled fluid, where the acid is selected from the group consisting of hydrochloric acid, hydrofluoric acid, formic acid, acetic acid, dicarboxylic acids, and mixtures thereof; and
reducing the viscosity of the VES gelled fluid with the internal breaker.

34. The method of claim 33 where the internal breaker is selected from the group consisting of bacteria, transition metal ion sources, saponified fatty acids, mineral oils, hydrogenated polyalphaolefin oils, saturated fatty acids, unsaturated fatty acids and combinations thereof.

35. The method of claim 34 where:
when the internal breaker is bacteria, the amount of bacteria ranges from about 0.01 to about 20.0 vol %,
when the internal breaker is a transition metal ion source, the amount of transition metal ion from the transition metal ion source ranges from about 0.01 to about 300 ppm,
when the internal breaker is a saponified fatty acid, the amount of saponified fatty acid ranges from about 50 to about 20,000 ppm,
when the internal breaker is selected from the group consisting of mineral oils, hydrogenated polyalphaolefin oils, saturated fatty acids, unsaturated fatty acids and combinations thereof, the amount of internal breaker ranges from about 0.1 to about 15 gptg;
all based on the VES gelled fluid.

36. The method of claim 33 further comprising heating the fluid to a temperature effective to cause the breaker to reduce the viscosity of the gelled aqueous fluid, where the effective temperature ranges from about 100 to about 400° F. (about 38 to about 204° C.).

37. The method of claim 33 where the internal breaker is a mineral oil and is at least about 99 wt % paraffin.

38. The method of claim 33 where the internal breaker is present in an oil-soluble internal phase of the water of the VES gelled fluid.

39. The method of claim 33 where the VES gelled fluid further comprises a fluid loss control agent selected from the group consisting of alkaline earth metal oxides, alkaline earth metal hydroxides, transition metal oxides, transition metal hydroxides, and mixtures thereof.

40. The method of claim 39 where the effective amount of the fluid loss control agent ranges from about 2 to about 200 pptg (about 0.2 to about 24 kg/m$^3$) based on aqueous VES treating fluid.

41. The method of claim 39 where a fluid loss control agent is introduced into the subterranean formation after the viscoelastic surfactant gelled fluid is introduced to build a pseudo-filter cake on the formation.

* * * * *